United States Patent Office 3,659,027
Patented Apr. 25, 1972

3,659,027
METHOD FOR PRODUCING PYROGEN-FREE SOLUTIONS
Verity C. Smith, 561 Bridge St., Dedham, Mass. 02026
Filed Apr. 17, 1968, Ser. No. 722,124
Int. Cl. A61k 27/00; A61l 1/00
U.S. Cl. 424—366
4 Claims

ABSTRACT OF THE DISCLOSURE

A pyrogen-free solution is produced by adding a base such as an alkali metal hydroxide to pyrogen contaminated water in an amount sufficient to bring the pH to at least 8.0, and preferably 12.0 Substantially pyrogen-free conditions are attained after a period of time which depends on the temperature and alkalinity. The hydroxide may be subsequently neutralized with an acid to produce a saline solution suitable for parenteral use.

---

This invention is directed to the preparation of pyrogen-free solutions for parenteral use. Pyrogens are fever-inducing substances which are present in most sources of water which have not been specially prepared. In the parenteral administration of drugs or other medications, the presence of pyrogenic substances is both undesirable and potentially very harmful, since the parenteral injections are given to those whose immunity to infection from various sources has been markedly decreased.

Among the more common methods of preparing pyrogen-free water are the use of distillation procedures at elevated temperatures and filtration of the water which is to be depyrogenated through laboratory-type filters of small pore size. These methods are only partially successful and do not always result in substantially pyrogen-free water.

I have found that alkali metal hydroxides readily attack pyrogenic substances, and over a period of time, substantially destroy the pyrogenic activity in solutions incorporating the caustic materials.

Since pyrogen-free solutions are ordinarily prepared for parenteral injections, they should also be isotonic, that is, should contain the proper percentage of solute to maintain the red blood corpuscles in the blood stream unaltered in form and to prevent the removal of hemoglobin from the corpuscles. A saline concentration of approximately 0.9% by weight is generaly accepted as the proper concentration for an isotonic solution. Generally, the desired degree of salt concentration is obtained in the parenteral solution by the addition of various salts to the pyrogen-free water before injection. In my process, I neutralize the hydroxides by the addition of acids of proper concentration and utilize this neutralization to form all or part of the salts required for the parenteral solution. Accordingly, it is a further object of my invention to provide a method of preparing pyrogen-free salt solutions for parenteral use.

Figure 1:
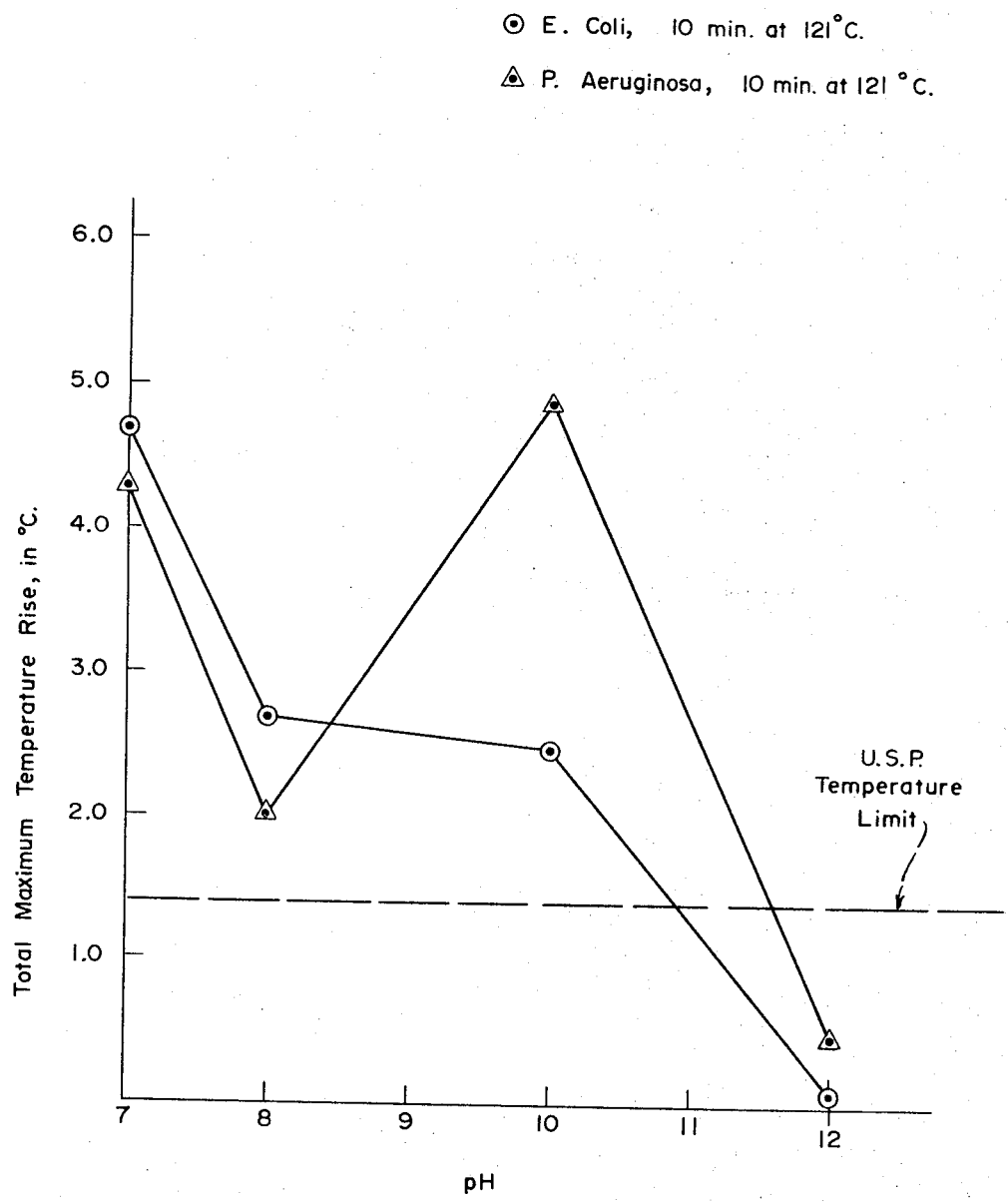
Figure 2:
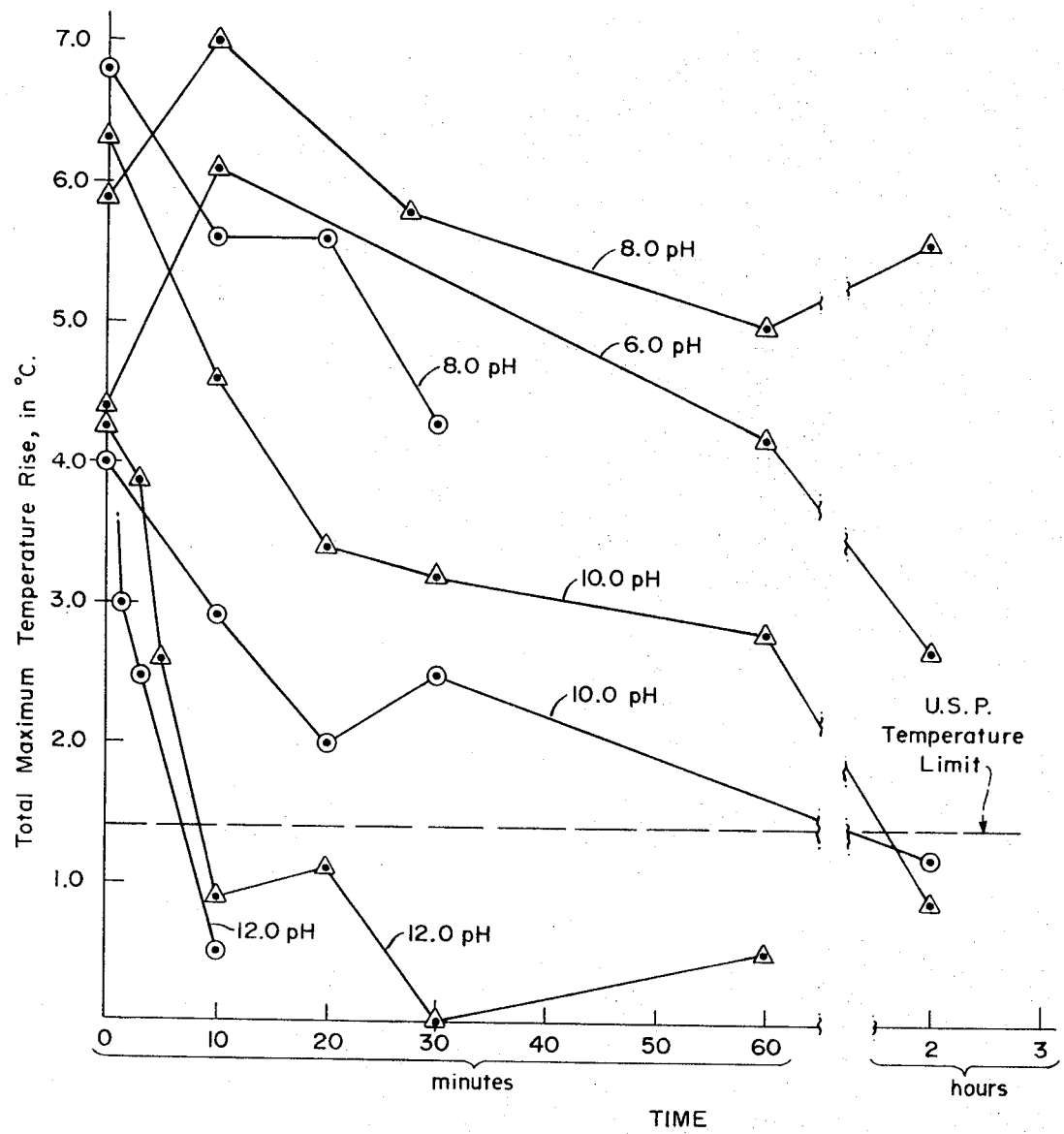
Figure 3:
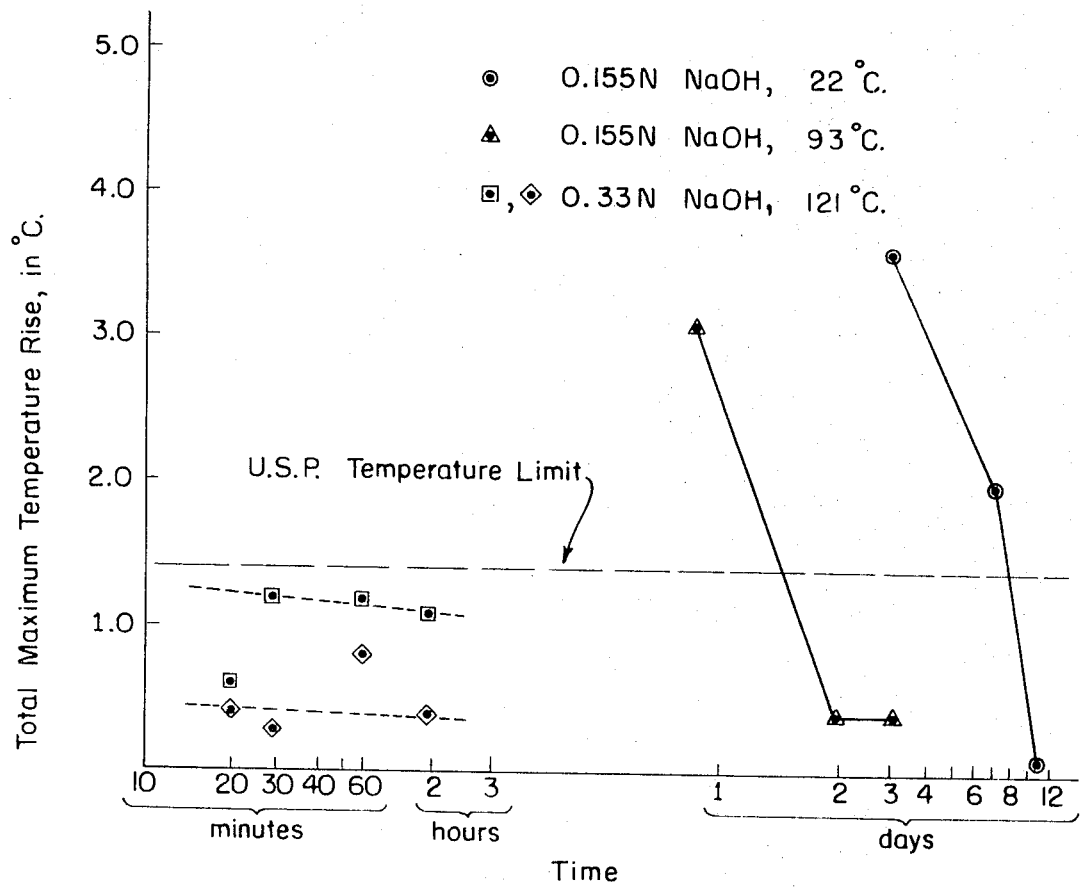

In the preferred method for producing isotonic pyrogen-free solutions, sodium hydroxide is added to the pyrogenic solution in an amount to bring the pH to 12.0. The hydroxide is then allowed to react with the pyrogens for 10 minutes or more while the temperature of the treated solution is maintained under pressure at 121° C. (250° F.). At the end of the treatment interval, the solution is neutralized with a 10% solution of hydrochloric acid. A small amount of sodium chloride may then be added to bring the solution exactly to the isotonic condition of 0.9% saline concentration by weight. Alternatively, a small amount of a pure solid such as the drug materail to be administered may be added to the neutralized solution to bring the solute concentration to 0.9% by weight. The effect of varying the conditions of the water treatment are shown in the accompanying drawings in which:

FIG. 1 is a graph showing the total maximum temperature rise in degrees centigrade in groups of three test rabbits plotted against the pH of the treated pyrogenic solution;

FIG. 2 is a graph showing the total maximum temperature rise in degrees centigrade in groups of three test rabbits plotted against the time during which the pyrogenic solution is exposed to the alkali metal hydroxide at various hydroxide concentrations as measured by their pH value; and FIG. 3 is a graph showing the total maximum temperature rise in degrees centigrade in groups of three test rabbits plotted against the time during which the pyrogenic solution is exposed to the alkali metal hydroxide at various treatment temperatures.

The preferred method described above is derived from the results of various tests, summarized in FIGS. 1–3, which were made to investigate the effect of alkali metal hydroxide concentration, treatment time, and treatment temperature in reducing pyrogen activity. In each of these tests, the level of pyrogen activity was measured by the temperature rises occurring in three rabbits which had been injected with a treated solution. The exact procedure followed is described in the United States Pharmacopeia, 16th revision, (1960) at page 887. To be classified as pyrogen free by U.S.P. standards, none of the test rabbits should exhibit a temperature rise greater than 0.6° C. during any hour interval after injection, and the total of the greatest temperature rises during each of the first three hour intervals after injection should not exceed 1.4° C.

FIG. 1 shows the dependence of pyrogen inactivation on pH. Solutions with pH's varying from 1 to 12 were treated for 10 minutes at 121° C. The results indicate that higher alkali metal hydroxide concentrations are more effective in destroying pyrogens, and in particular, a pyrogen-free solution is achieved in only 10 minutes when the pH is 12.0. These results are approximately identical for solutions contaminated with pyrogens from *Pseudomona aeruginosa* organisms (data enclosed in circles).

The graphs in FIG. 2 show that for a given pH, and at a constant temperature of 121° C., the pyrogen activity generally decreases as the treatment interval is extended. But more important is the fact that the pH of the treated solution must be at least 8.0 to produce a significant reduction in pyrogen activity regardless of how long the treatment interval is continued. Moreover, the treatment interval is progressively shortened as the hydroxide concentration is increased. With a pH of 12.0 and a temperature of 121° C., a pyrogen-free solution results in only 10 minutes.

The effect of various treatment temperatures is shown by the data in FIG. 3. The test represented graphically in FIG. 3 employed very high alkali metal hydroxide concentrations (0.155 N=13.191 pH; 0.33 N=13.51 pH) so that the results are clearly due to changes in the treatment temperature. At a temperature of 121° C., pyrogen activity is reduced to a safe level in minutes, provided that the alkali metal hydroxide concentration is high. With a reduction in the treatment temperature to 93° C., even at the high pH of 13.191, nearly 2 days are required to reach the U.S.P. temperature limit. A further reduction in the temperature to 22° C. results in a treatment time of about 9 days before reaching a safe level of pyrogen activity. It will be noticed that the ordinate in FIG. 3 is calibrated in linear units, while the abscissa is calibrated in logarithmic units.

Since, as a practical matter, as short a treatment time as is possible is desirable, the preferred method employs a pH of 12.0 and a treatment temperature of 121° C. In general, the reaction is preferably accelerated by increasing the temperature rather than the alkali metal hydroxide concentration since the hydroxide concentration is limited by the requirements of isotonicity. For example, a solution of approximately 6.2 grams of sodium hydroxide in one liter of pyrogenic water (0.155 N) is a maximum desirable concentration since, after neutralization with hydrochloric acid, the concentration of sodium chloride will be about 9 grams per liter of water which is 0.9% by weight.

Although the chemistry of pyrogenic materials is not yet fully understood, it is believed that pyrogens are probably lipopolysaccharides which are capable of grouping together to form complex hydrophilic-hydrophobic moieties. Treatment of these groupings with sodium hydroxide apparently causes rupture of the attractive bonds between the sub-groupings so that the grouping is destroyed and re-grouping is prevented. By conducting tests using buffers to alter the cation concentration and tests using a strong acid as the digesting agent it has been found that the hydroxyl ion is the active chemical radical in destroying pyrogens.

Although I have described my invention with reference to sodium hydroxide as the caustic digesting agent, other salts may be effectively obtained on neutralization. For example, potassium hydroxide may be substituted as the caustic agent, and citric acid or a solution of 85% lactic acid may be used as the neutralizing agent. Since various other changes will occur to those skilled in the art and may be made without departing from the scope of my invention, it is intended that the foregoing material be interpreted as illustrative only and not in a limiting sense.

Having described my invention what I claim is:

1. A method of preparing a substantially pyrogen-free water for use in parenteral administration of drugs and medication comprising the steps of adding an alkali metal hydroxide selected from the group consisting of sodium hydroxide and potassium hydroxide to the water to be depyrogenated to provide an alkali metal hydroxide solution having a pH of at least 8.0; maintaining said alkali metal hydroxide solution at a temperature of at least about 22° C. for a sufficient time to destroy the pyrogenic material; and subsequently neutralizing said alkali metal hydroxide solution with an acid.

2. The method defined in claim 1 in which said acid is selected from the group consisting of hydrochloric acid, citric acid and lactic acid.

3. The method defined in claim 1 in which the alkali metal hydroxide treated solution is maintained at a temperature in excess of 100° centigrade before neutralization with said acid.

4. The method defined in claim 1 further comprising adjusting the salt concentration of the pyrogen-free water to 0.9% saline concentration by the addition of sodium chloride.

References Cited

Gershenfeld, Bacteriology and Allied Subjects, 1945, pp. 345–350.

ALBERT T. MEYERS, Primary Examiner

D. M. STEPHENS, Assistant Examiner